United States Patent Office

2,805,152
STEEL ALLOY WELDING ROD AND JOINT DEPOSIT

Raymond F. Sherwin, North Chicago, Ill., assignor to The Chicago Hardware Foundry Company, North Chicago, Ill., a corporation of Illinois No Drawing. Application January 23, 1956, Serial No. 560,863

7 Claims. (Cl. 75—125)

The present invention is directed to an improved welding rod having free flowing characteristics even at relatively low temperatures, and particularly useful in the welding of cast iron or similar materials.

In a common method for gas welding cast iron, the cast iron is preheated prior to the welding operation so as to avoid shrinkage stresses and cracks at the junction. In making the weld, the joint to be welded is formed with a V, and a suitable flux is distributed over the area to be welded. Then, the gas flame, usually from an oxyacetylene torch, is played on the V until the walls of the metal begin to melt. A welding rod, dipped in the flux, is then brought to a red heat and rubbed into the molten metal.

A weld of the type described above should be at least as strong as the metal of the surfaces which it joins. At the same time, the weld deposit must not be so hard as to be brittle so that the welded piece may fail by impact.

An object of the present invention is to provide an improved welding rod having free flowing characteristics even at relatively low temperatures.

Another object of the present invention is to provide an improved welding rod for general use in the welding of cast iron and the like which requires little or no flux for its successful application.

Another object of the invention is to provide a welding rod having excellent tensile strength characteristics without being excessively hard.

A still further object of the present invention is to provide a welded joint between ferrous members having a weld deposit thereon of improved properties.

Cast iron welding rods used for oxyacetylene welding of cast iron, nickel-iron, and other ferrous alloys frequently contain about 3 to 3.5% carbon, a comparable amount of silicon, and smaller amounts of manganese, sulphur, and phosphorus. I have now found that the inclusion of relatively small, controlled amounts of the metals copper and nickel have very beneficial effects upon such rods, both from the standpoint of better flowability of the rod material during the welding operation, and with regard to the character of the weld produced. Specifically, the welding rod of the present invention has an analysis within the following range:

TABLE I

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance |

In the preferred embodiment of the invention, the copper content and the nickel content of the above analysis are controlled within the range of about 0.5% to about 1.5% each.

In welding two ferrous articles together with the welding rod of the present invention, the best results are obtained if the surfaces to be joined are preheated to a temperature of about 600° F. A minimum amount of flux is advisable in order to avoid gassing of the weld. After the rod has been rendered molten, it is advisable to puddle the molten weld with the flame lightly to eliminate porosity. At the completion of the welding operation, it is advisable to play the welding torch back over the welded area to relieve strains.

The weld resulting from the welding rod of the present invention gives a more fluid weld at a lower temperature, thereby producing a much more easily machinable weld and a cleaner weld free from dirt and inclusions. The weld deposit has a tensile strength usually on the order of 45,000 to 50,000 lbs. per sq. in., and a finer grain structure than occurs with ordinary cast iron welding rods. The use of the welding rod of the invention also results in a cleaner surface with a brighter luster than possible with ordinary cast iron rods.

Metallurgically, the deposited metal is characterized by a grey iron structure containing a normal distribution of pearlite and finely flaked graphite in a ferritic matrix. This type of structure may be characterized as a "soft" weld in contrast to the hard and brittle welds frequently obtained with ordinary cast iron rods. The desired decrease in hardness is not accompanied by a substantial effect on the tensile strength, as welds produced from the welding rod of the invention, in all cases tested, were at least as strong as the ferrous bodies to which the welds were applied.

In order to avoid oxidation of the rod during storage, it is desirable to coat the surface of the welding rod with copper, the thickness of the coating usually being in the range from about 0.001 to about 0.005 inch.

Hardness tests on the welds produced according to the present invention indicate that the hardness of the weld is low enough for the weld to be considered "soft" and usually ranges from a Brinell hardness number of 238 to about 256. These measurements, mentioned in the specification, were taken at a load of 1500 kilograms on a 10 mm. ball tester.

The following specific example illustrates the manner of producing the welding rod of the present invention, as well as the results achieved.

Example

The starting material for the manufacture of the weld rod was a typical weld rod iron containing 3.25 to 3.50% carbon, 2.75 to 3.00% silicon, 0.60 to 0.75% manganese, 0.50 to 0.75% phosphorus, and a maximum of 0.08% sulfur. This weld rod iron was melted in a cupola at a temperature of 3200° F. and poured into ladles which were inoculated with ½% by weight of copper and ½% by weight of nickel shot. The molten material was poured into sand molds, and resulted in a welding rod having the following analysis:

TABLE II

| | Percent by weight |
|---|---|
| Carbon | 3.42 |
| Silicon | 2.85 |
| Manganese | 0.69 |
| Phosphorus | 0.655 |
| Sulfur | 0.078 |
| Copper | 0.54 |
| Nickel | 0.52 |
| Iron | Balance except for usual impurities |

The rods were removed from the sand and put through a cleaning process after which they were placed in a copper coating tank where a thin copper coating was applied to each rod.

The presence of the nickel and the copper was found to decrease the normal melting point in about 10° to 25° F. as compared with a similar rod iron but not containing the nickel and copper.

Two pieces of cast iron were welded together with the use of the welding rod of the above example and each weld revealed a complete, satisfactory fusion of the deposited metal and the base metal. No slag or other inclusions were evident. The weld evidenced good machinability.

The Brinell hardness number of the base metal was 160, while at the wall next to the weld the Brinell hardness number was 170. The Brinell hardness number of the weld itself averaged about 238.

From the foregoing, it will be evident that the welding rod of the present invention provides welds of excellent strength and hardness characteristics. The welding rods also improve the welding operation by providing a free flowing weld deposit that requires little or no flux for its application.

It wil be evident that various modifications can be made to the described embodiments without departing from the scope of the present invention.

I claim as my invention:

1. A welding rod having an analysis in the following range:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance |

2. A welding rod having an analysis in the following range:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.5 to 1.5 |
| Nickel | 0.5 to 1.5 |
| Iron | Substantially the balance |

3. A welding rod having an analysis in the following range:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance | said rod having a thin coating of copper thereon.

4. A welding rod having an analysis in the following range:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.5 to 1.5 |
| Nickel | 0.5 to 1.5 |
| Iron | Substantially the balance | said rod having a thin coating of copper thereon.

5. A welded joint having a weld deposit having the following analysis:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance | said weld deposit being characterized by a dispersion of pearlite and graphite flakes throughout a ferritic matrix.

6. A welded joint having a weld deposit with the following analysis:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance | said weld deposit being characterized by a dispersion of pearlite and graphite flakes throughout a ferritic matrix.

7. A welded joint having a weld deposit capable of being machined and having the following analysis:

| | Percent by weight |
|---|---|
| Carbon | 3.25 to 3.50 |
| Silicon | 2.75 to 3.00 |
| Manganese | 0.60 to 1.00 |
| Phosphorus | 0.50 to 0.75 |
| Sulfur | 0.08 max. |
| Copper | 0.10 to 3.0 |
| Nickel | 0.10 to 3.0 |
| Iron | Substantially the balance | said weld deposit having a Brinell hardness number in the range from about 238 to about 256.

References Cited in the file of this patent
UNITED STATES PATENTS

| 2,256,138 | Cape at al. | Sept. 16, 1941 |
| 2,323,711 | Franklin | July 6, 1943 |

UNITED STATES PATENT OFFICE

CERTIFICATE OF CORRECTION

Patent No. 2,805,152                      September 3, 1957

Raymond F. Sherwin

It is hereby certified that error appears in the above numbered patent requiring correction and that the said Letters Patent should read as corrected below.

In the heading to the printed specification, lines 2 and 3, title of invention, for "STEEL ALLOY WELDING ROD AND JOINT DEPOSIT" read -- WELDING ROD --.

Signed and sealed this 19th day of August 1958.

(SEAL)
Attest:

KARL H. AXLINE
Attesting Officer

ROBERT C. WATSON
Commissioner of Patents